United States Patent
Pau et al.

(10) Patent No.: US 9,600,744 B2
(45) Date of Patent: Mar. 21, 2017

(54) ADAPTIVE INTEREST RATE CONTROL FOR VISUAL SEARCH

(71) Applicant: STMicroelectronics S.r.l., Agrate Brianza (MI) (IT)

(72) Inventors: Danilo Pietro Pau, Sesto San Giovanni (IT); Mirko Falchetto, Milzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 103 days.

(21) Appl. No.: 13/869,652

(22) Filed: Apr. 24, 2013

(65) Prior Publication Data

US 2013/0279813 A1 Oct. 24, 2013

Related U.S. Application Data

(60) Provisional application No. 61/637,529, filed on Apr. 24, 2012.

(51) Int. Cl.
| | |
|---|---|
| G06K 9/62 | (2006.01) |
| G06T 7/20 | (2017.01) |
| G06K 9/46 | (2006.01) |
| G06T 7/00 | (2017.01) |

(52) U.S. Cl.
CPC ............. G06K 9/6228 (2013.01); G06K 9/46 (2013.01); G06T 7/0028 (2013.01); G06T 7/2033 (2013.01)

(58) Field of Classification Search
None
See application file for complete search history.

(56) References Cited

U.S. PATENT DOCUMENTS

| | | | | |
|---|---|---|---|---|
| 5,694,334 A * | 12/1997 | Donahue | ................. | H04L 29/06 348/E7.071 |
| 5,715,325 A * | 2/1998 | Bang | ................. | G06K 9/00228 382/118 |
| 5,842,194 A * | 11/1998 | Arbuckle | ............. | G06K 9/6857 382/224 |
| 6,115,494 A * | 9/2000 | Sonoda et al. | ................ | 382/165 |
| 6,480,626 B1 * | 11/2002 | Venable | .................. | G06T 9/001 382/173 |
| 6,639,624 B1 * | 10/2003 | Bachelder | .......... | G01R 31/2813 348/126 |

(Continued)

OTHER PUBLICATIONS

<Website> ProDSP Technologies "http://www.prodsp.hu/event-detection-intelligent-camera/".*

(Continued)

*Primary Examiner* — Chan Park
*Assistant Examiner* — Mia M Thomas
(74) *Attorney, Agent, or Firm* — Seed IP Law Group LLP

(57) ABSTRACT

Image-processing apparatus and methods to adaptively vary an interest point threshold value and control a number of interest points identified in an image frame are described. Sub-regions of an image frame may be processed in a sequence, and an interest point threshold value calculated for each sub-region. The calculated value of the interest point threshold may depend upon pre-selected values and values determined from the processing of one or more prior sub-regions. By using adaptive thresholding, a number of interest points detected for each frame in a sequence of image frames may remain substantially constant, even though objects within the frames may vary appreciably.

16 Claims, 7 Drawing Sheets

(56) References Cited

U.S. PATENT DOCUMENTS

| | | | | |
|---|---|---|---|---|
| 6,667,766 | B2* | 12/2003 | Matsutani | H04N 5/357 348/241 |
| 6,687,402 | B1* | 2/2004 | Taycher | G06K 9/6204 382/199 |
| 6,711,293 | B1 | 3/2004 | Lowe | |
| 6,750,871 | B2* | 6/2004 | Nishikawa | G09G 5/39 345/543 |
| 6,810,293 | B1* | 10/2004 | Chou et al. | 700/90 |
| 6,871,409 | B2* | 3/2005 | Robb et al. | 33/288 |
| 6,971,066 | B2* | 11/2005 | Schultz | G06F 8/34 348/207.1 |
| 7,012,642 | B1* | 3/2006 | Zell | H04N 5/253 348/246 |
| 7,073,158 | B2* | 7/2006 | McCubbrey | 716/104 |
| 7,460,686 | B2* | 12/2008 | Yoda | B61L 23/00 348/135 |
| 7,587,699 | B2* | 9/2009 | McCubbrey | 716/104 |
| 7,769,236 | B2* | 8/2010 | Fiala | G06K 9/3216 382/199 |
| 7,822,264 | B2* | 10/2010 | Balslev | G06K 9/48 382/154 |
| 7,860,387 | B2* | 12/2010 | Ishikawa | G03B 13/20 396/124 |
| 8,126,190 | B2 | 2/2012 | Jung et al. | |
| 8,224,064 | B1* | 7/2012 | Hassebrook | G01B 11/2513 345/585 |
| 8,270,671 | B1* | 9/2012 | Medasani et al. | 382/103 |
| 8,416,985 | B2* | 4/2013 | Martin | H04H 60/33 382/103 |
| 8,421,868 | B2* | 4/2013 | Hamada | G06K 9/6203 348/208.1 |
| 8,456,327 | B2* | 6/2013 | Bechtel et al. | 340/937 |
| 8,792,673 | B2 | 7/2014 | Levien et al. | |
| 9,025,817 | B2* | 5/2015 | Knauth | G06K 9/00771 382/103 |
| 2004/0060032 | A1* | 3/2004 | McCubbrey | 716/16 |
| 2004/0136611 | A1* | 7/2004 | Reiners | G06K 9/6203 382/291 |
| 2006/0056654 | A1* | 3/2006 | Yoda | B61L 23/041 382/103 |
| 2006/0206850 | A1* | 9/2006 | McCubbrey | 716/17 |
| 2007/0241863 | A1* | 10/2007 | Udagawa | G06K 9/00335 340/5.83 |
| 2007/0273766 | A1* | 11/2007 | Wilson | G01S 3/7864 348/169 |
| 2007/0274387 | A1* | 11/2007 | Kurahashi | G06K 9/3266 375/240.13 |
| 2007/0280547 | A1* | 12/2007 | Mitsui | H04N 19/105 382/253 |
| 2008/0056607 | A1* | 3/2008 | Ovsiannikov | 382/275 |
| 2008/0101715 | A1* | 5/2008 | Barnes | G06K 9/4671 382/264 |
| 2008/0181457 | A1* | 7/2008 | Chattopadhyay | G06K 9/00771 382/103 |
| 2008/0239330 | A1* | 10/2008 | Sato | H04N 1/0036 358/1.1 |
| 2008/0267506 | A1* | 10/2008 | Winder | G06K 9/4671 382/190 |
| 2008/0291274 | A1 | 11/2008 | Merkel et al. | |
| 2008/0298689 | A1* | 12/2008 | Ashbrook | G06F 17/30265 382/224 |
| 2010/0020223 | A1* | 1/2010 | Vice | G06T 15/20 348/333.02 |
| 2010/0215266 | A1* | 8/2010 | Higuchi | G06T 5/005 382/167 |
| 2010/0232643 | A1* | 9/2010 | Chen | G06K 9/4671 382/103 |
| 2010/0328316 | A1* | 12/2010 | Stroila | G06K 9/00818 345/441 |
| 2011/0044543 | A1* | 2/2011 | Nakamura | G06K 9/00798 382/190 |
| 2011/0069175 | A1* | 3/2011 | Mistretta | G06T 5/50 348/164 |
| 2011/0103458 | A1* | 5/2011 | Huang | H04L 25/03878 375/233 |
| 2011/0216948 | A1* | 9/2011 | Yalla | G06K 9/00006 382/125 |
| 2011/0228846 | A1* | 9/2011 | Eilat et al. | 375/240.08 |
| 2012/0050074 | A1* | 3/2012 | Bechtel et al. | 340/988 |
| 2012/0140233 | A1* | 6/2012 | Rockwell et al. | 356/445 |
| 2012/0163672 | A1* | 6/2012 | McKinnon | 382/106 |
| 2012/0182392 | A1* | 7/2012 | Kearns et al. | 348/46 |
| 2012/0183224 | A1 | 7/2012 | Kirsch | |
| 2013/0088426 | A1* | 4/2013 | Shigeta | G06F 3/017 345/156 |
| 2013/0250113 | A1* | 9/2013 | Bechtel et al. | 348/148 |
| 2013/0279751 | A1* | 10/2013 | Bruna et al. | 382/103 |
| 2013/0279762 | A1* | 10/2013 | Pau et al. | 382/107 |
| 2013/0293469 | A1* | 11/2013 | Hakoda | G06F 3/048 345/158 |
| 2013/0301930 | A1* | 11/2013 | Vigliar et al. | 382/201 |
| 2013/0301950 | A1* | 11/2013 | Vigliar et al. | 382/260 |
| 2013/0322524 | A1* | 12/2013 | Jang et al. | 375/240.03 |
| 2014/0002658 | A1* | 1/2014 | Kim | B60Q 9/008 348/148 |
| 2014/0049373 | A1* | 2/2014 | Troy | G06K 9/001 340/5.83 |
| 2014/0185910 | A1* | 7/2014 | Bryll | G06K 9/50 382/141 |
| 2014/0293091 | A1* | 10/2014 | Rhoads et al. | 348/234 |
| 2015/0172576 | A1* | 6/2015 | Erbudak | H04N 5/33 348/164 |
| 2016/0112647 | A1* | 4/2016 | Mercier | H04N 5/23229 348/294 |

OTHER PUBLICATIONS

Lai et al. "Proposed FPGA Hardware Architecture for High Frame Rate (>100fps) Face Detection Using Feature Cascade Classifiers" Biometrics: Theory, Applications, and Systems, 2007. Btas 2007. First IEEE International Conference on (Sep. 2007) pp. 1-6.*

Pettersson et al., "Online Stereo Calibration using FPGAs," Proceedings of the IEEE Intelligent Vehicles Symposium, Jun. 6-8, 2005, pp. 55-60.

"Hamming distance," retrieved from http://en.wikipedia.org/wiki/Hamming_distance on Jul. 30, 2014, 3 pages.

Basu, "Gaussian-Based Edge-Detection Methods—A Survey," *IEEE Transaction on Systems, Man, and Cybernetics—Part C:Applications and Reviews* 32(3):252-260, Aug. 2002.

Bonato et al., "A Parallel Hardware Architecture for Scale and Rotation Invariant Feature Detection," *IEEE Transactions on Circuits and Systems for Video Technology* 18(12): 1703-1712, Dec. 2008.

Calonder et al., "Brief: Computing a Local Binary Descriptor Very Fast," *IEEE Transactions on Pattern Analysis and Machine Intelligence* 34(7):1281-1298, Jul. 2012.

Hess, "An Open-Source SIFT Library," ACM Proc. of the Int. Conference on Multimedia (MM), Florence, Italy, 2010, http://robwhess.github.io/opensift/, 4 pages.

Huang et al., "High Performance SIFT Hardware Accelerator for Real-Time Image Feature Extraction," *IEEE Transactions on Circuits and Systems for Video technology* 22(3):340-351, Mar. 2012.

Huggett et al., "A Dual-Conversion-Gain Video Sensor with Dewarping and Overlay on a Single Chip," IEEE International Solid-State Circuits Conference (ISSCC) 2009, Session 2—Imagers 2.8, pp. 52-54.

Lowe, "Distinctive Image Features from Scale-Invariant Keypoints," *International Journal of Computer Vision* 60(2):91-110, 2004.

Mizuno et al., "A Low-Power Real-Time SIFT Descriptor Generation Engine for Full-HDTV Video Recognition," *IEICE Trans. Electron* E94-C(4):448-457, Apr. 2011.

O'Shea, "Bachet's Problem: As Few Weights to Weigh Them All," arXiv: 1010.5486v1 [math.HO], Oct. 26, 2010, pp. 1-15.

(56) References Cited

OTHER PUBLICATIONS

Park, "Communication: The r-complete partitions," *Discrete Mathematics* 183:293-297, 1998.

Rosten et al., "Faster and Better: A Machine Learning Approach to Corner Detection," *IEEE Transactions on Pattern Analysis and Machine Intelligence* 32(1):105-119, Jan. 2010.

Chen et al., "Hardware Oriented Content-Adaptive Fast Algorithm for Variable Block-Size Integer Motion Estimation in H.264," *Proceedings of the 2005 International Symposium on Intelligent Signal Processing and Communication Systems*, Hong Kong, China, Dec. 13-16, 2005, pp. 341-344.

Kim et al. "Computer Control by Tracking Head Movements for the Disabled," *Lecture Notes in Computer Science: Computers Helping People with Special Needs*, ICCHP 2006, vol. 4061, pp. 709-15, 2006.

* cited by examiner

ADAPTIVE INTEREST RATE CONTROL FOR VISUAL SEARCH

CROSS-REFERENCE TO RELATED APPLICATION

This application claims the benefit of U.S. provisional application Ser. No. 61/637,529, filed on Apr. 24, 2012, which applications are incorporated herein by reference to the maximum extent allowable by law.

BACKGROUND

Technical Field

The technology relates to machine vision, and to electronic processing of captured images to identify a substantially constant number of interest points in the captured images even though the images may contain appreciably different objects.

Discussion of the Related Art

The detection of interest points within electronically-captured images is useful for a variety of computer-vision applications. For example, interest point detection may be used in machine-implemented methods for image matching, localization, mapping, and/or object recognition. Examples of interest points include, without being limited to, edges, corner, ridges, localized contrasted regions and blobs. For machine-vision applications to operate satisfactorily, a suitable number of interest points may be required to be identified and processed per image frame. If too few interest points are used, a machine-vision application may fail to recognize an image or an object in an image, for example. On the other hand, if a large number of interest points are used per image frame, the image-processing application may yield accurate results. However, a large number of interest points increases the processing burden on the system, and may undesirably slow down or, in some cases, overwhelm an image-processing system such that image processing may not be capable in real time or important data may be lost.

SUMMARY

Methods and apparatus for controlling a number of interest points detected for an image frame and/or image sub-region are described. The detection of interest points may be based upon an interest point detection threshold that is adaptively adjusted during processing of image sub-regions so as to limit a number of detected interest points to an approximately constant number for each image frame. The number of interest points per frame may be pre-selected, e.g., selected based upon image processing resources, selected based upon a desired performance level of an image-processing application. The selected number of interest points may remain approximately constant even though scenes captured and processed may change significantly over a sequence of frames.

According to some embodiments, an image processing system having at least one processor that implements adaptive thresholding and controls a number of interest points detected in images comprises an interest point detector that is configured to identify one or more interest points in a first sub-region of image data. The sub-region of image data may be associated with an image frame for a captured image. The one or more interest points may be identified based upon an interest point threshold value. The image processing system may further comprise a rate controller that is configured to determine the interest point threshold value based at least in part upon a number of interest points identified in a previous sub-region of image data for the image frame.

In some embodiments, an image processing method for implementing adaptive thresholding and controlling, by at least one processor, a number of interest points detected in images comprises identifying, by an interest point detector, one or more interest points in a first sub-region of image data that is associated with an image frame. The identification of the one or more interest points may be based upon an interest point threshold value. The method may further comprise determining, by a rate controller, the interest point threshold value based at least in part upon a number of interest points identified in a previous sub-region of image data for the image frame.

According to some embodiments, controlling detected interest points in an image frame may be implemented as computer-readable medium including machine-readable instructions that, when executed by at least one processor, adapt the at least one processor to identify one or more interest points in a first sub-region of image data that is associated with an image frame. The identification of the one or more interest points may be based upon an interest point threshold value. The machine-readable instructions may further adapt the at least one processor to determine the interest point threshold value based at least in part upon a number of interest points identified in a previous sub-region of image data for the image frame.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing.

DETAILED DESCRIPTION

In various embodiments, image-processing systems and methods are adapted to control a number of interest points detected in captured images for machine-vision applications. Examples of interest points include, without being limited to, edges, corner, ridges, localized contrasted regions and blobs. In various embodiments, an interest-point threshold value is dynamically adjusted during the processing of an image frame. The interest-point threshold may be used (e.g., by at least one processor adapted to analyze the image frame) to identify interest points in the image. The interest point threshold may be based at least in part on a total amount of interest points allotted for the image frame, in some embodiments. The interest-point threshold value may be based upon other values computed during the processing of an image frame, in some embodiments. In this manner, an approximately constant number of interest points may be identified for each frame in a succession of image frames, even though scenery within the frames may vary significantly.

The systems and methods may be useful for video data in which a sequence of images are captured and processed to generate optical flow data. The optical flow data may be utilized in machine-vision applications relating to mobile communications, automotive technology, surveillance technology, machine automation and control, video gaming, infotainment, and other technologies that may implement object recognition and/or tracking. Adaptive control of interest points may reduce the computational burden on image-processing systems by selectively reducing the amount of image-related data (e.g., descriptor data) handled when evaluating matching of image features.

Figure 1A:
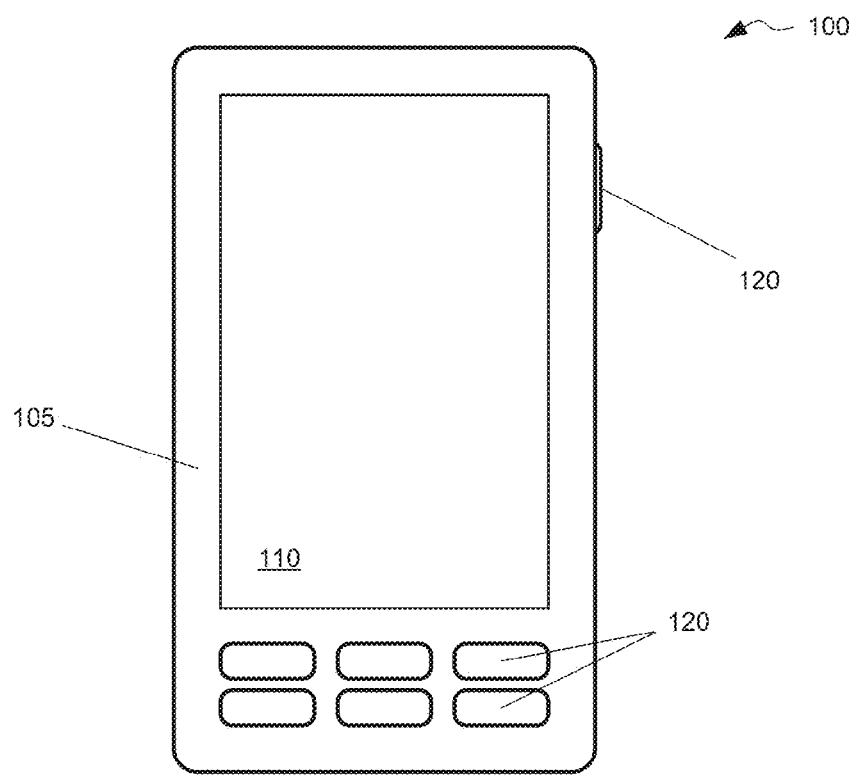
FIG. 1A depicts a device, e.g., a smart phone, in which embodiments of the present technology may be implemented.

FIG. 1A depicts a device 100 (e.g., a smart phone, camera, personal digital assistant, pad or tablet computer) in which embodiments of controlled interest-point detection may be implemented. The device may be a hand-held device, or may be a larger electronic device such as a laptop or personal computer. In some implementations, the device 100 may include a casing 105 and display screen 110, which may be a touch screen. The device may contain one or more operational buttons 120 that may be used to operate the device. Within the casing 105 may be complex digital and analog circuitry configured to provide a variety of operational functions, e.g., still and/or video image recording, audio recording, graphic display on the screen 110, audio reproduction, numerical computation, word processing, and electronic communications with other devices in a network. In some embodiments, the device 100 may be distributed or integrated in a larger apparatus, such as a vehicle, surveillance system, or an electronic gaming system.

Figure 1B:
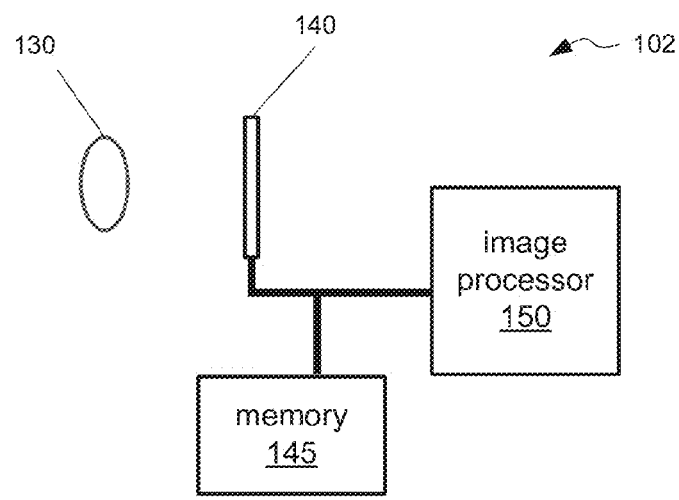
FIG. 1B depicts components of an image capture apparatus, according to some embodiments.

According to some embodiments, the device 100 may include image-capture apparatus 102, as depicted in FIG. 1B. The image-capture apparatus may comprise at least one optical lens 130 and at least one sensor array 140. The sensor array 140 may comprise a CMOS photosensor array, or any other suitable photosensing array, and include a plurality of imaging pixels that are configured to convert incident photons that integrated over a short, predetermined time interval, into an electronic signal. The electronic signal may be read out from each pixel in the sensor array 140. Data read from the pixels may be stored in memory 145 and/or communicated to an image processor 150. The data read from pixels may be formatted into a frame format, or any suitable format, and be representative of a captured image. The data may contain monochrome information and/or color information that may be used to reproduce the captured image.

The image processor 150 may include circuitry configured to execute some or all of the adaptive thresholding and/or interest point control functionality described below. In some embodiments, the image processor may be configured to execute other or additional image processing functions, e.g., filtering, data compression, data formatting, etc. The memory 145 and image processor 150 may be in communication with other components of the device 100, e.g., in communication with at least one processor of the device 100.

Next-generation devices that include improvements to devices like those described above in connection with FIG. 1A may include video analytics capabilities. Such devices may be used for various applications, including but not limited to, mobile computing and/or communications, automotive applications, electronic gaming-related visual search, infotainment, printing applications, and surveillance. Video analytics capabilities may require interest point detection and analysis of still images and/or image sequences obtained in video filming. For explanatory purposes, FIG. 2 portrays a captured image frame 210 that includes an object 220, for which six interest points 225 have been identified. In this case, the interest points correspond to corner features. In a practical application, there may be many more interest points detected in an image, e.g., between about 100 and about 1000 in some embodiments, between about 1000 and about 5000 in some embodiments, between about 5000 and about 10000 in some embodiments, and yet more than 10000 in some embodiments.

Image processing for machine-vision applications may be associated with each interest point. For example, descriptor data may be generated for some or all of the identified interest points. Any one or combination of algorithms may be used to identify interest points and generate descriptor data. One algorithm, referred to as Scale-Invariant Feature Transform (SIFT), may be used to identify interest points and generate associated descriptor data for each interest point. A descriptor may be a data string that is substantially independent from geometric transformation. (See, for example, David G. Lowe, "Distinctive Image Features from Scale-Invariant Keypoints", International Journal of Computer Vision, 60, 2 (2004), pages 91-110, which is incorporated herein by reference in its entirety). Another algorithm, referred to as Compressed Histogram of Gradients (CHoG), provides a solution in a compressed image domain. It is designed to provide good performance with reduced-size data sets for features. Another algorithm, referred to as Speeded Up Robust Features (SURF), represents an improvement in speed over SIFT and provides fast feature detection with robustness to certain image transformations, and with less computational resources. In some embodiments, descriptor data may be generated using an algorithm described by M. Calonder et al. in "BRIEF: Computing a local binary descriptor very fast," *IEEE Transactions on Pattern Analysis and Machine Intelligence*, vol. 34, num. 7, pp. 1281-1298 (2011), or by E. Rosten et al. in "Faster and better: a machine learning approach to corner detection," *IEEE Transactions on Pattern Analysis and Machine Intelligence*, Vol. 32, Issue 1, pp. 105-119 (2010), both articles which are incorporated herein by reference in their entirety. Regardless of how the interest points are identified and how the descriptors are generated, the interest points and/or descriptors may be used to identify and/or track features in one or more images, or otherwise used for machine-vision applications.

As noted above and recognized by the inventors, interest point detection can produce large amounts of data that is to be processed by an image processor. For example, satisfactory machine-vision performance may require about 1024 interest points to be detected per image frame, in some embodiments. In some cases, descriptor data associated with one interest point may require data from an N×M pixel region around the interest point, where N=M=16. Assuming that a binary descriptor of 256 bits is computed for each interest point, and 2 frames are compared, then the amount of memory needed for the descriptor data alone is over 0.5 megabits. There may be any number of interest points identified in an image, e.g., more than 100 in some embodiments, more than 1000 in some embodiments, and more than 10,000 in some embodiments. The number of interest points may depend upon the processing resources available in the image processing system. Also, the size of an image region from which a descriptor is computed may be any size, e.g., N and M may each be any integer value and may or may not be equal to each other. As may be appreciated, a large amount of data may be produced and handled for successive frames of a video sequence.

A countervailing factor to data reduction in machine-vision applications is "recognition rate." Recognition rate R is generally defined as a ratio of a number of matched interest points $P_m$ to a total number of identified interest points T in a frame, and may be expressed as the following relation.

$$R = \frac{P_m}{T} \quad (1)$$

The value of R typically ranges from 0 to 1, where a value near 1 indicates a higher probability that compared images contain matching features that can be recognized and/or tracked by a machine-vision application. A match between interest points may be determined using any suitable feature matching algorithm, e.g., by computing a Hamming distance between binary descriptors as described in the article by Calonder et al. referenced above, or as described at the internet site http://en.wikipedia.org/wiki/Hamming_distance. Matches may be identified based at least in part upon a value of a minimum Hamming distance, for example. If there are too few interest points per frame (e.g., too little data), the recognition rate R may fall to a lower value indicating inadequate feature matching for satisfactory machine-vision performance. It is desirable to identify enough interest points and obtain enough matched points $P_m$ in order to increase the probability that two compared images will accurately recognize or not recognize features common or not common to both images.

Figure 3:
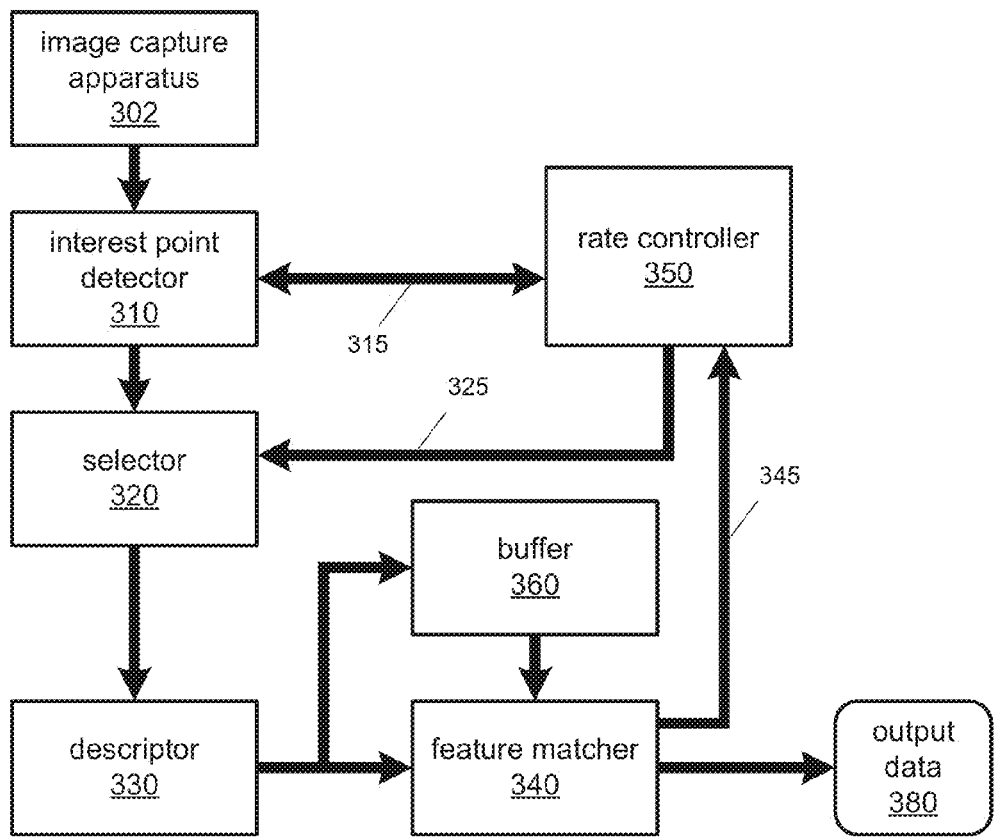
FIG. 3 depicts an image processing system configured to dynamically control a number of interest points detected in an image frame, according to some embodiments.

An apparatus with video analytics capabilities and adapted to control interest point detection may include some or all of the system components shown in FIG. 3, in some embodiments. The system may include an interest point detector 302, a selector 320, a descriptor 330, a buffer 360, a feature matcher 340, and a rate controller 350. In some embodiments, the system may further include image capture apparatus 302, e.g., image capture apparatus as described above in connection with FIG. 1B.

In overview, the interest point detector 310 may be configured to receive image data and identify a plurality of interest points 225 in the received image data. The interest point detector 310 may receive interest-point threshold data from rate controller 350, and communicate interest point data to the rate controller. The interest point detector 310 may communicate interest point and/or image data to selector 320 and descriptor 330. The selector 320 may be configured to select, from the interest points identified by interest point detector, a number of interest points for further image processing. The selector 320 may receive target interest point data from rate controller 350. The selected interest points may be communicated to descriptor 330, which may generate descriptor data for some or all of the selected interest points. Selected interest point data, descriptor data, and optionally image data, may be communicated to buffer 360 and feature matcher 340. The feature matcher may be configured to determine matches between interest points of at least two images based upon descriptor data and/or interest point data for the two images. The feature matcher 340 may output match results along with other data as output data 380, and may communicate a recognition rate R to rate controller 350. Rate controller 350 may be configured to process data from feature matcher 340 and interest point detector 310 to determine or adjust an interest-point threshold value and selector criteria used by interest point detector 310 and selector 320.

With regard to communicating information between system components, a first system component may communicate a value to a second system component in any one of several methods. For example, a first system component may provide an address location or pointer to the second system component identifying where the value is stored, or may place the computed value in an address accessed by the second component and notify the second component when the computed value is available. Alternatively, the first system component may transmit the value as digital or analog data, directly or indirectly, to the second system component.

In further detail, interest point detector 310 may comprise digital and/or analog hardware, software executing on at least one processor, at least one field-programmable gate array, or a combination thereof configured to receive captured image data and process the image data to identify a plurality of interest points 225. The image data may be multi-bit, formatted data representative of an image captured by image-capture apparatus 302, for example. The interest points may be extracted according to any suitable interest point extraction algorithm as described above, e.g., SIFT, SURF, CHoG, etc. In some embodiments, interest point detector 310 may also determine geometric or orientation parameters associated with a received image, or a region of the image around an associated interest point. For example, the interest point detector 310 may determine and provide a coordinate position (x, y) for each extracted interest point. The coordinate position may identify the location of the interest point within the captured image, and may be expressed in terms of pixel numbers. In some implementations, the interest point detector may determine one or more rotational values associated with the received image or sub-regions of the image. The rotational values may reflect any one or more of pitch $\theta_x$, yaw $\theta_z$, and roll $\theta_y$ of an object in the image. In some embodiments, the interest point detector 310 may determine one or magnification M values associated with the received image and/or sub-regions of the image.

The term "software" may be used herein to refer to machine-readable instructions that are recognizable and executable by at least one processor. The machine-readable instructions may be embodied in any type of programming language, and stored on at least one manufacture storage device, e.g., RAM, ROM, cache memory, CD-ROM, removable memory devices, etc.

Figure 2:
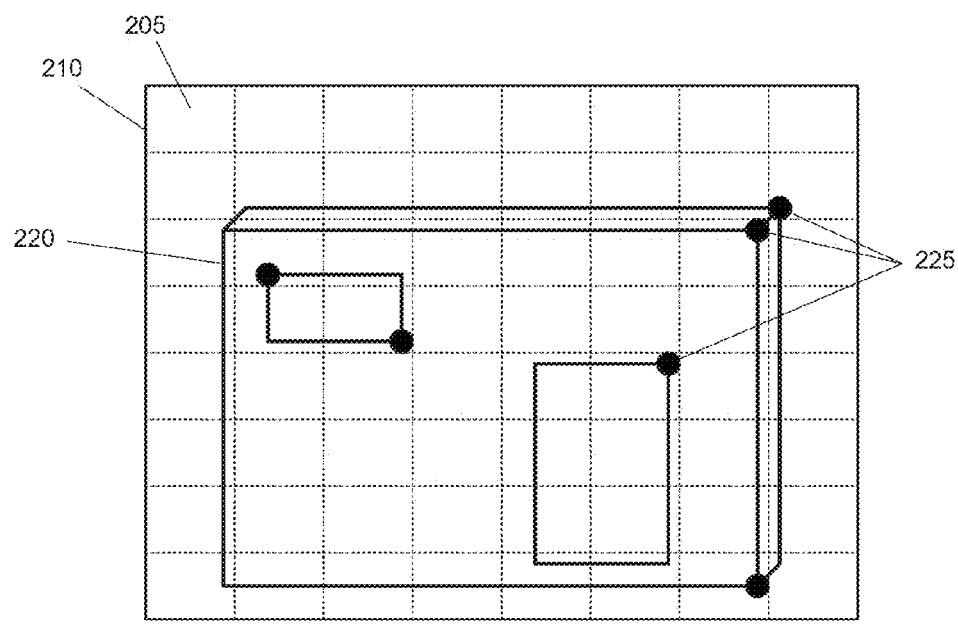
FIG. 2 portrays an electronically captured two-dimensional image of an object 220, in which the image frame 210 is partitioned into a plurality of sub-regions 205.

The interest point detector 310 may be configured to analyze received image data by parsing the image data into sub-regions, e.g., sub-regions 205 portrayed in FIG. 2. There may be any number of sub-regions associated with an image, e.g., between about 10 and about 50 in some embodiments, between about 50 and about 100 in some embodiments, between about 100 and about 250 in some embodiments, and yet more than 250 in some implementations. The sub-regions may be of a same size, or may be of different sizes. The sub-regions 205 may be processed by the interest point detector 310 in an orderly manner, e.g., sequentially along rows or columns, a serpentine manner, expanding outward from a corner or the center of the image. In some embodiments, the sub-regions 205 may be processed by the image point detector 310 in a random access manner.

When processing a $j^{th}$ sub-region 205, the interest point detector 310 may be configured to identify interest points 225 within a sub-region based at least in part on an interest-point threshold value $Th_j$ determined for the sub-region. The value $Th_j$ may be computed by rate controller 350 and communicated to interest point detector via a communication link 315.

The interest point detector 310 may also be configured to communicate to the rate controller 350, via link 315, a number of identified interest points detected in a sub-region. The interest point detector may communicate the number of identified interest points after processing each sub-region of received image data.

The interest point detector 310 may produce interest point data, and communicate the interest point data to one or more downstream components, e.g., selector 320 and descriptor 330. The interest point data may include any combination of data received and produced by the interest point detector and formatted in any suitable format. In some implementations, interest point data may comprise for any one interest point, one or more of an identifier for the interest point, a position (e.g., pixel coordinates) for the interest point, an orientation of the interest point, and a magnification associated with the interest point. For example, the interest point data for any one interest point may be represented by data values [x, y, $\theta_y$, M]. Additional or less data may be provided for any one interest point. In some embodiments, interest point data may include a number of interest points identified for an image sub-region, an identification of the sub-region, and some or all image data that is received by the interest point detector 310. In some implementations, interest point data may be prepared as metadata and attached to, or associated with, received image data.

Rate controller 350 may comprise digital and/or analog hardware, software executing on at least one processor, at least one field-programmable gate array, or a combination thereof configured to compute at least interest-point threshold values for use by interest point detector 310. The threshold values may be computed on a sub-region by sub-region basis as interest point detector analyzes received image data. According to some embodiments, rate controller 350 may be configured to compute sub-region threshold values $Th_j$ for a $j^{th}$ sub-region according to the following equation.

$$Th_j = Th_{j-1}\left[K_1 + K_2 \frac{np_{j-1} - tp_{j-1}}{tp_{j-1}}\right] \quad (2)$$

In EQ. 2, $np_{j-1}$ represents a number of interest points detected for a $j-1^{th}$ sub-region and $tp_{j-1}$ represents a target number of interest points for the $j-1^{th}$ sub-region. $K_1$ and $K_2$ represent scaling constants that may be predetermined or preselected based upon a total number of interest points T allotted for an image frame. Each of $K_1$ and $K_2$ may have a value ranging from 0 to 1. In some embodiments, $K_1=1$, so that when $np_{j-1}$ equals $tp_{j-1}$, the interest point threshold value is not altered for the next sub-region. In some implementations, $K_1$ and $K_2$ may be determined via training runs using training image data.

A value for the target number of interest points tp for a sub-region may be calculated according to the following equation.

$$tp_j = \frac{T - Np}{N_s} \quad (3)$$

Np represents the total number of interest points identified for all prior processed sub-regions in an image, and may be given by $$Np = \sum_{i=1}^{i=j-1} np_i \quad (4)$$

and $N_s$ represents the number of sub-regions for an image, and may be given by $$N_s = \frac{W \times H}{W_s \times H_s} \quad (5)$$

where W and H are the width and height of the received image, and $W_s$ and $H_s$ are the width and height of a sub-region. In EQ. 5, it is assumed that all sub-regions are of the same size.

From EQ. 3, it can be seen that a budget for the number of target interest points in a sub-region is adaptively modified and uniformly distributed over remaining sub-regions following an analysis of each sub-region. For example, EQ. 3 may be recomputed by rate controller 350 after the analysis of each sub-region by interest point detector 310. EQ. 2 indicates that the interest point threshold value $Th_j$, for a sub-region is adaptively altered based at least upon a number of interest points detected in a prior analyzed sub-region $np_{j-1}$. $Th_j$ may be computed on a sub-region by sub-region basis by rate controller 350 as sub-regions are analyzed by interest point detector 310. When $tp_{j-1}$ is determined by EQ. 3, the interest point threshold value $Th_j$ also depends in part on T, the total allotted interest points for an image frame, and Np, the total number of interest points identified for all prior processed sub-regions in the image. By redistributing target interest point values, e.g., as in EQ. 3, and by adaptively controlling interest point threshold values, e.g., as in EQ. 2, a number of interest points detected per image frame can be controlled in a manner that maintains an approximately uniform distribution of the interest points.

According to some embodiments, predetermined initial values for $Th_1$ and $tp_1$ may be used for processing data related to a first sub-region of an image. The predetermined values may be selected from a data store based upon one or more image criteria, e.g., an image sharpness quality, a number of interest points allotted for an image, a number of sub-regions used to process the image, etc. In some embodiments, $Th_1$ and $tp_1$ may be determined from a training run with training image data.

Additional embodiments are contemplated for calculating $Th_j$ and $tp_j$, and for controlling a number of interest points per image frame. In some embodiments, a pre-analysis of an image may executed to establish values for $Th_j$ and $tp_j$. For example, the interest point detector 310 may first use a fixed interest point threshold value $Th_0$ and pre-analyze all sub-regions to identify a first total number of interest points $T_0$ for an image. The number of interest points identified for each sub-region $tp_j'$ may be stored in a first data table $TAB_1$. A second look-up table (LUT) $TAB_2$ may be created that contains calculated values for $Th_j$ and $tp_j$ for each sub-region. The calculated values $Th_j$ and $tp_j$ may be based upon the values in $TAB_1$. For example, $Th_j$ may be a scaled value of $Th_0$ and $tp_j$ may be a scaled value of $tp_j'$. The scaling may be based upon a total number of interest points allotted for the frame. In some implementations, $tp_j$ may be a scaled value of a global average of values $tp_j$. In some embodiments, $tp_j$ may be a scaled value of a local average of $tp_j'$, e.g., a local average based upon M nearest-neighbor sub-regions. The nearest-neighbor sub-regions may be located within predetermined horizontal and vertical distances from the $j^{th}$ sub-region.

In some embodiments, the values from $TAB_2$ may be used by the interest point detector 310 as the interest point threshold values and target interest point value for each sub-region in a second analysis of the received image data to identify interest points for further processing by descriptor 330 and feature matcher 340. In some embodiments, the values from $TAB_2$ may be used by rate controller 350 when computing $Th_j$ and $tp_j$ from EQS. 2 and 3.

In another embodiment, a target interest point value for sub-regions may be based in part upon recognition rates computed for the sub-regions. For example, EQ. 3 may be modified to include a recognition rate $R_j$ as in the following equation.

$$tp_j = \frac{T/R_j - Np}{N_s} \quad (6)$$

$R_j$ may be a recognition rate computed by feature matcher 340 for a prior analyzed sub-region, e.g., $R_j = R_{j-1}$. In some implementations, $R_j$ may be a cumulative average recognition rate given by the following equation.

$$R_j = \frac{\sum_{i=1}^{i=j-1} R_i}{j-1} \quad (7)$$

EQS. 6 and 7 indicate that if Rj is close to 1, e.g., most interest points are generating positive matches at feature matcher 340, then the number of target interest points per sub-region $tp_j$ does not need to be increase. However, if $R_j$ decreases toward 0, then more target interest points are needed so as to increase a number of positive matches at the feature matcher. In some embodiments, rate controller 350 is configured to receive an indication of recognition rate $R_j$ from feature matcher, and compute a target interest point value for sub-regions in accordance with EQ. 6 and in some implementations using EQ. 7.

Once $Th_j$ and $tp_j$ have been determined for a sub-region, using any one of the above-described embodiments, interest point detector 310 may analyze the sub-region and identify an actual number of interest point $np_j$ that may be less than, equal to, or greater than $tp_j$. In some implementations, the image processing system includes a selector 320 that may limit a number of output interest points $op_j$ communicated to the descriptor 330. Selector 320 may comprise digital and/or analog hardware, software executing on at least one processor, at least one field-programmable gate array, or a combination thereof configured to limit the number of output interest points $op_j$ to a value less than or about equal to the target interest point value $tp_j$ for the sub-region. For example, if $np_j > tp_j$, then selector randomly or selectively discards data associated with identified interest points such that $op_j = tp_j$. However, if $np_j \leq tp_j$, then selector 320 retains data associated with identified interest points such that $op_j = np_j$. The value $tp_j$ may be communicated to the selector 320 from rate controller 350 via a data link 325 for each sub-region, according to some embodiments. When selectively discarding data associated with identified interest points, the selector may be configured to discard the data such that remaining interest points are distributed over the sub-region uniformly. In some embodiments, the selector 320 may be configured to discard interest point data based on image texture surrounding the interest point. For example, interest points having less image texture around an interest point may be discarded first. Interest point data retained by selector 320 may be passed to descriptor 330 for descriptor generation.

Descriptor 330 may comprise digital and/or analog hardware, software executing on at least one processor, at least one field-programmable gate array, or a combination thereof configured to generate descriptor data for one or more of the interest points received from the selector 320. Descriptor data may be generated using any suitable descriptor algorithm, such as those used in SIFT, SURF, CHoG, BRIEF, or FAST referenced above. The descriptor data may be communicated to a buffer 360 and a feature matcher 340. The descriptor data may be combined with interest point data and/or image data when communicated to buffer 360 and feature matcher 340.

Buffer 360 may comprise any suitable type and form of memory element, e.g., RAM, ROM, or cache memory. The memory may be configured in any suitable manner, e.g., FIFO, ring memory, etc. According to some embodiments, the buffer may be sized to store an amount of data associated with at least one image frame, e.g., at least enough memory to store interest point data and descriptor data for one image frame. According to some embodiments, the buffer 360 may be sized to store only an amount of data associated with at least two image frames. In some implementations, the buffer 360 may be sized to store only an amount of data associated with two sub-regions of images, where images may be processed and compared on a sub-region by sub-region basis. In some embodiments, buffer 360 may be sized to store additional data, e.g., some or all of received image data from image capture apparatus 302.

In some embodiments, the image processing system may further include a feature matcher 340, as depicted in FIG. 3. The feature matcher 340 may comprise digital and/or analog hardware, software executing on at least one processor, at least one field-programmable gate array, or a combination thereof configured to receive feature data for two images and to compare the feature data to determine whether there are matching features between the two images. The feature data may include interest point data, descriptor data, and/or image data. In some implementations, the feature matcher 340 may be configured to compare at least descriptor data of a first image, e.g., descriptor data received from descriptor 330, with descriptor data of at least one second image. In some implementations, the at least one second image used by feature matcher may comprise one or more prior images obtained in a sequence of recorded images, e.g. a video sequence. Descriptor data for the at least one second image may be stored in buffer 360. According to some embodiments, the at least one second image used by feature matcher may comprise one or more images obtained from an internet-based data store. The internet-based data store may provide associated descriptor data for the images, or the image processing system shown in FIG. 3 may be configured to process the images to obtain descriptor data.

According to some embodiments, the feature matcher 340 may be configured to compare at least descriptor data received from the descriptor 330 against descriptor data of a stored image to determine a match of, track, or recognize, one or more features in an image. In some embodiments, feature matcher 340 may perform other machine-vision operations. Any suitable feature matching algorithm may be used, e.g., finding a minimum Hamming distance, or using a matching algorithm described in any of the above-cited references. The feature matcher may output match results in output data 380 that may be used by downstream processing apparatus to make decisions or perform operations based upon the number of matched features.

The feature matcher 340 may also be configured to calculate at least one recognition rate $R_j$. The calculated recognition rate may be for a sub-region of an image, or may be a cumulative rate, as expressed in EQ. 7. The feature matcher 340 may communicate the recognition rate to rate controller 350 via a data link 345.

Figure 4:
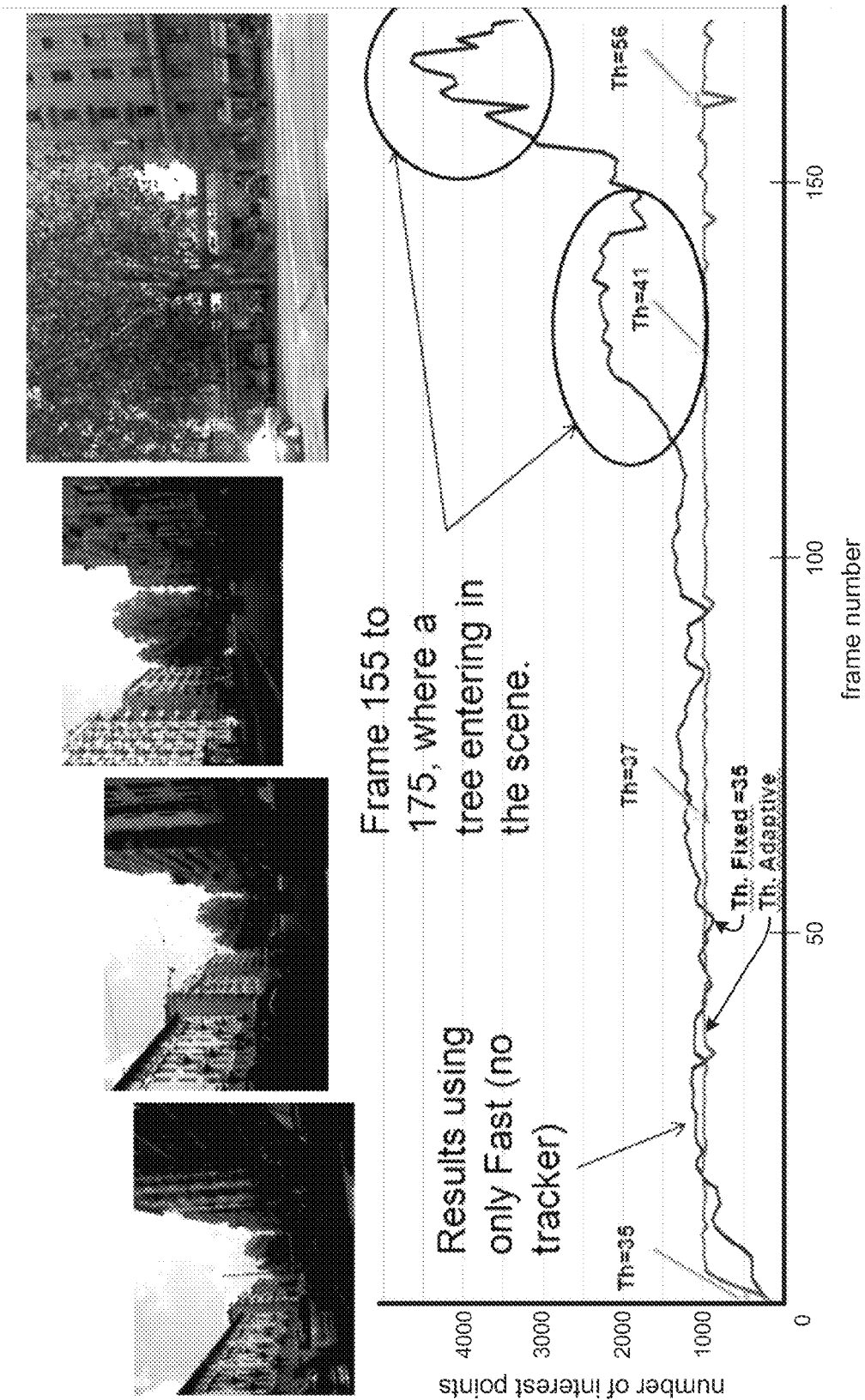
FIG. 4 is a graph comparing results of interest-point detection as a function of frame number for a sequence of images in which the imaged scene changes.

FIG. 4 shows results from an implementation of interest point control in an image processing system. A sequence of about 200 image frames were processed using two methods. Both methods employed the FAST method referenced above. In the first method, a threshold value used interest point identification was held fixed for each image frame, and interest points were identified by the interest point detector as values that exceeded the fixed interest point threshold value. In the implementation, the fixed value was selected to be 35. Other embodiments may use other threshold values. As can be seen in FIG. 4, the number of interest points detected for the frames varied significantly when the interest point threshold value was held fixed. For example, the number of identified interest points varied from about 1000 over a majority of frames to more than 4500 interest points. A large number of interest points were identified when a tree occupied a significant portion of the image, as indicated in the reproduced image data shown above the graph.

In the second method, adaptive thresholding for frame sub-regions was employed to control interest point detection, according to an embodiment described above. In this case, the number of interest points identified remained approximately constant over the majority of frames at about 1000 points. The graph shows that an average threshold value for a frame varied from 35 as an initial seed value to 56.

The apparatus depicted in FIG. 3 may be implemented on a single device, or may be implemented on separate devices. For example, an interest point detector 310, selector 320, descriptor 330, feature matcher 340, buffer 360, and rate controller 350 may be implemented on a device 100, in some embodiments. In some embodiments, the device may further include image capture apparatus. In other embodiments, a portion of the components may be implemented on a first device, e.g., a mobile electronic device such as a mobile phone, and a portion of the components may be implemented on a second device or second devices in communication with the first device.

Figure 5A:
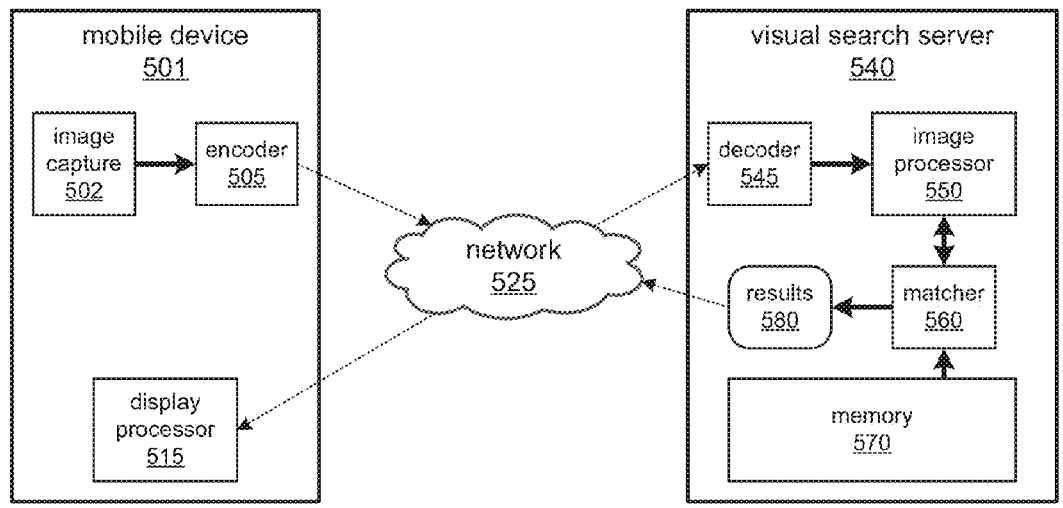
FIGS. 5A-5C illustrate networked image processing, according to various embodiments.
Figure 5B:
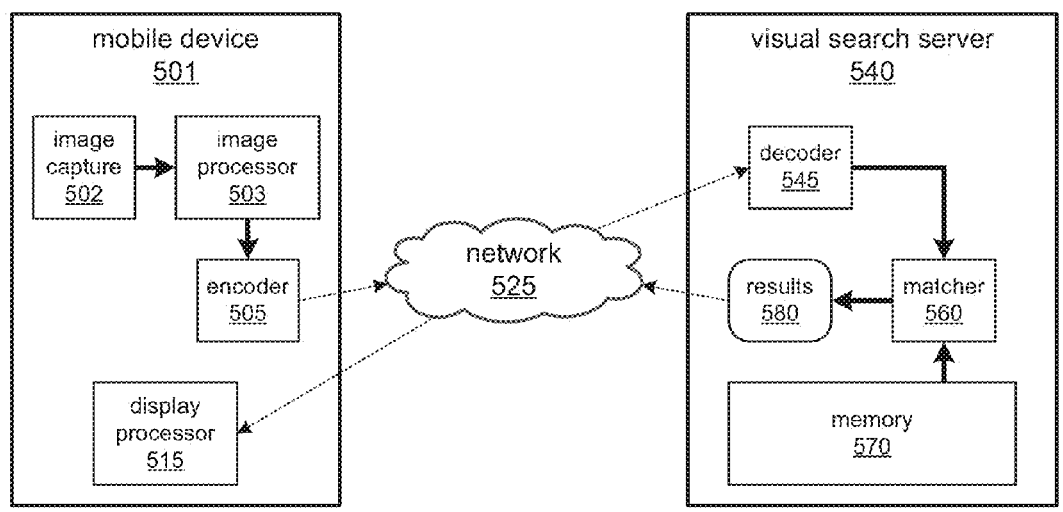
Figure 5C:
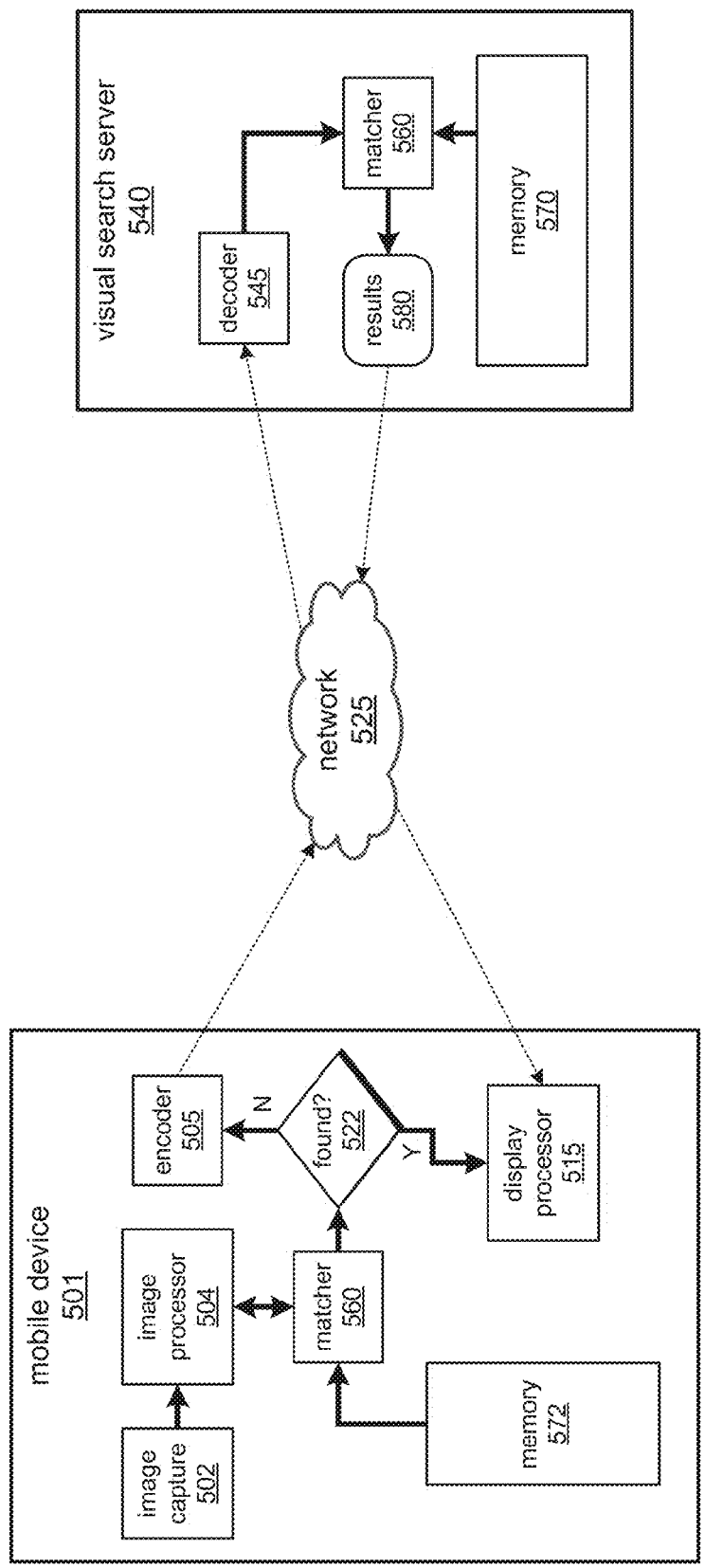

FIGS. 5A-5C depict embodiments of systems in which interest point control may be implemented when processing image data for machine-vision applications. According to some embodiments, a mobile device 501 may include image capture apparatus 502 and an encoder 505. Image data associated with captured images may be encoded by encoder 505 for transmission over a network 525 to a visual search server 540. The visual search server may include a decoder 545, an image processor 550, a feature matcher 560, and memory 570, as depicted in FIG. 5A. Memory may be part of the visual search server or may be a large repository of image data that is accessible by the visual search server 540. The image processor 550 may comprise an interest point detector 310, selector 320, descriptor 330, buffer 360 and rate controller 350 as described above. The feature matcher 560 may be configured to execute some, all, or additional functionality of feature matcher 340 described above. Results from feature matcher 560 may be returned to the mobile device 501 for display via display processor 515. Display processor may comprise a video-graphics display circuit in communication with a display screen. Results returned to mobile device 501 may be subject to encoding at visual search server 540 and decoding at mobile device 501.

In another embodiment, the mobile device 501 may include an image processor 503, as depicted in FIG. 5B. Image processor 503 may comprise an interest point detector 310, selector 320, descriptor 330, and rate controller 350 as described above. A recognition rate $R_j$ may or may not be returned from feature matcher 560 of the visual search server to the image processor during processing of image frames. For example, when interest point threshold values are set independent of recognition rate, e.g., using EQ. 2 and EQ. 3 above, a recognition rate $R_j$ may not be returned from feature matcher 560 to the image processor 503. In other embodiments, when interest point threshold values are set based upon a recognition rate, e.g., using EQ. 2 and EQ. 6 above, a recognition rate $R_j$ may be returned from feature matcher 560 to the image processor 503 as an image frame is being analyzed. Accordingly, data associated with the processing of image sub-regions may be communicated, e.g., streamed, over the network 525 to visual search server 540 prior to completing processing of an image frame. Feature matching may occur at visual search server 540.

In some embodiments, a mobile device may include both an image processor 504 and feature matcher 560 (as depicted in FIG. 5C) that together comprise an interest point detector 310, selector 320, descriptor 330, rate controller 350, buffer 360, and feature matcher 340 as described above in connection with FIG. 3. The mobile device 501 may further include memory 572 that may comprise a plurality of feature data, e.g., descriptor data, interest point data, etc., that may be accessed by feature matcher 560. Memory 572 may include a removable memory device, and in some embodiments, may include memory remotely accessed by the mobile device 501.

The mobile device 501 may further include logic element 522 that is configured to provide data from the image processor 504 and/or feature matcher 560 to either encoder 505 or display processor 515. If feature matcher 560 makes a positive match between captured image data and feature data stored in memory 572 or a buffer 360 (not shown), then logic element may provide data from feature matcher 560 to display processor 515 for displaying results, information, or otherwise indicating actions taken based on the positive match. If feature matcher 560 does not make a positive match, then logic element 522 may provide data from feature matcher 560 to encoder 505 where the data may be encoded for transmission to visual search server 540. Additional feature matching may be executed at the visual search server, so as to utilize additional feature data from memory 570.

Figure 6:
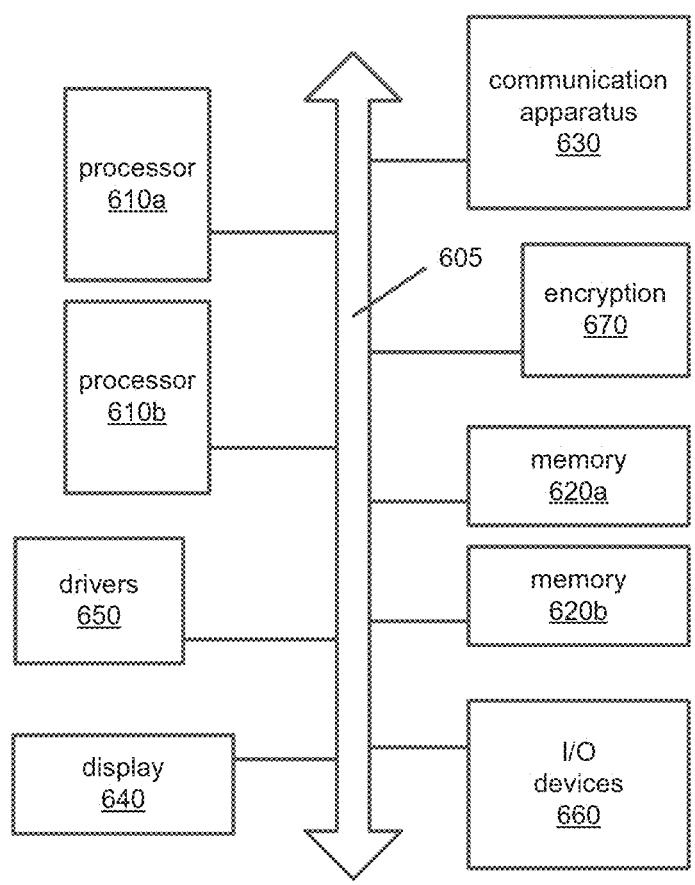
FIG. 6 depicts components of a device that may be used in some embodiments of the present technology.

Referring now to FIG. 6, an electronic device 100 (FIG. 1) configured to implement adaptive interest point thresholding and interest point control may further comprise at least one processor 610*a*, 610*b* and related hardware. The at least one processor may be configured to control and provide user interaction for operating the device 100. The at least one processor may be used to implement, and/or be used in combination with, some or all of the system components described above in connection with FIG. 3. In some implementations, some or all of the components shown in FIG. 3 may be implemented via machine-readable instructions executed on the at least one processor 610*a*, 610*b*. When in operation, an operating system may execute on at least one processor and provide for user interaction and operation of the electronic device 100, which may include running multiple software applications and/or programs on the device. The at least one processor may be used in combination with memory 620*a*, 620*b* that may be used to store machine-readable instructions, image data, feature data, and/or other data associated with image processing. The memory may include any type and form of RAM-type memory device and/or ROM-type memory device. Other data that may be stored may include, but are not limited to, interest point data, interest point threshold data, descriptor data, recognition rate data, and match results. Some data may be stored temporarily in ring buffers and selectively transferred to long-term storage. Data may be communicated, via a wireless or wired link, to one or more devices in a network.

According to some embodiments, a processor 610*a*, 610*b* may comprise any type and form of data processing device, e.g., any one or combination of a microprocessor, microcontroller, a digital signal processor, an application specific integrated circuit (ASIC), and at least one field-programmable gate array (FPGA). There may be more than one processor in the system in some embodiments, e.g., dual core or multi-core processors, or plural processors communicating with at least one controlling processor. In some embodiments, one or more of the image processing system components may be implemented by a dedicated FPGA or ASIC.

The electronic device may further include a display 640 (e.g., comprising any one or combination of a video monitor, an LCD display, a plasma display, an alpha-numeric display, LED indicators, a touch screen, etc.). The electronic device 100 may include one or more input/output devices 660 (e.g., keyboard, touchpad, buttons, switches, touch screen, microphone, speaker, printer), and communication apparatus 630 (e.g., networking software, networking cards or boards, wireless transceivers, and/or physical sockets). The electronic device 100 may include device drivers 650, e.g., software modules specifically designed to execute on the one or more processor(s) and adapt the processor(s) to communicate with and control system components. In some embodiments, the device may include encryption/decryption hardware and/or software 670 that may be used to encrypt selected outgoing data transmissions and decrypt incoming encrypted data transmissions. Components of the electronic device 100 may communicate over a bus 605 that carries data and control signals between the components. The bus may provide for expansion of the system to include other components not shown in FIG. 6.

Figure 7:
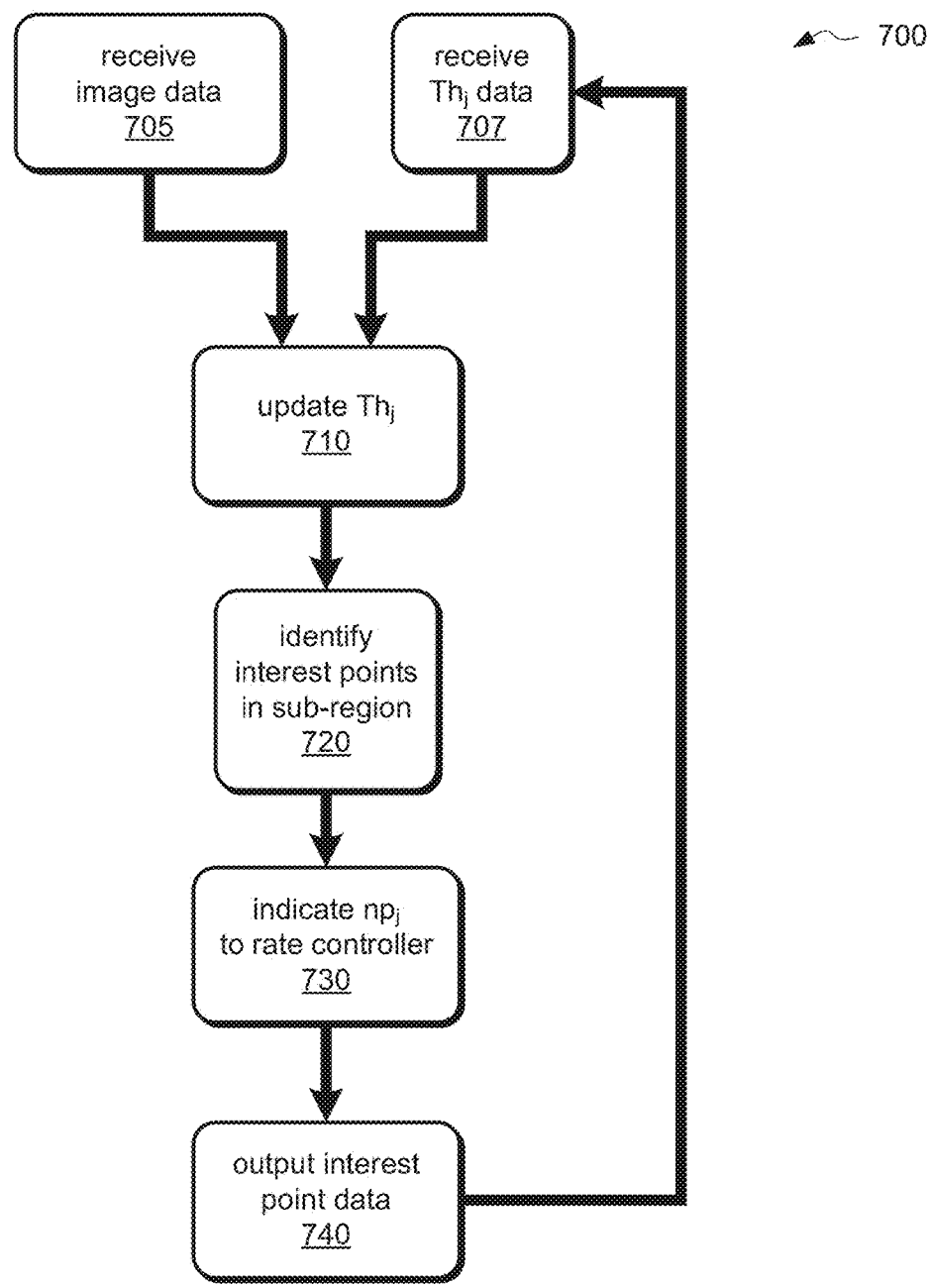
FIG. 7 depicts acts of an image processing method implementing interest point control, according to some embodiments.

An embodiment of an image processing method 700 for adaptive interest point thresholding and interest point control is depicted in the flow chart of FIG. 7. According to some embodiments, an image processing method may comprise receiving image data 705, by an interest point detector, wherein the image data may be representative of a first image. The image data may be received for a full image frame, or may be received for a sub-region of an image frame. The method 700 may further comprise receiving interest point threshold data 707 from a rate controller. The received interest point threshold data may be a value $Th_j$ for an interest point threshold that is to be used by the interest point detector to identify interest points, in some embodiments. In some implementations, the received interest point threshold data may comprise a total number of target points T for an image frame, a target number of points $tp_j$ for an image sub-region, and/or a recognition rate $R_j$ that may be used by the interest point detector to calculate an interest point threshold value. The image processing method 700 may further comprise updating 710 and interest point threshold value $Th_j$ used by the interest point detector to identify interest points in an image sub-region.

According to some embodiments, image processing method 700 may further comprise identifying 720, by the interest point detector, interest points in an image sub-region. Any suitable interest-point-detection algorithm may be used to identify the interest points. In various embodiments, the interest points are identified based at least in part upon the interest point threshold value $Th_j$ received or determined for the $j^{th}$ image sub-region. In some implementations, that act of identifying 720 interest points may further comprise parsing received image data into sub-regions.

The image processing method 700 may further comprise indicating 730, by the interest point detector, a number of identified interest points $np_j$ in the $j^{th}$ image sub-region to a rate controller. The method 700 may further include outputting 740, by the interest point detector, interest point data that may be used by downstream image processing components, e.g., a descriptor and feature matcher.

In some embodiments, the method 700 may further include receiving, by a rate controller, the number of identified interest points $np_j$ from the interest point detector, and calculating, by the rate controller, an interest point threshold value $Th_{j+1}$ or a next image sub-region based at least in part on the value of $np_j$.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An image processing system, comprising:
   one or more memories configured to store image data; and
   image processing circuitry, which, in operation:
      identifies one or more interest points in a first sub-region of image data associated with an image frame based upon an interest point threshold value;
      determines the interest point threshold value based at least in part upon a number of interest points identified in a previous sub-region of image data for the image frame; and processes image data associated with the image frame based on the identified interest points, wherein the image processing circuitry is configured to:

determine the interest point threshold value based in part upon a recognition rate;

generate descriptor data for at least one identified interest point; and evaluate matches between features of two or more images based at least in part on the descriptor data, wherein the image processing circuitry is configured to determine the interest point threshold value based in part upon a target number of interest points calculated for the previous sub-region.

2. The image processing system of claim 1 wherein the image processing circuitry comprises a field-programmable gate array.

3. The image processing system of claim 1 wherein the image processing circuitry includes interest point detection circuitry and rate control circuitry and the interest point detection circuitry is configured to receive the interest point threshold value from the rate control circuitry and to communicate a number of identified interest points in the first sub-region to the rate control circuitry.

4. The image processing system of claim 1 wherein the image processing circuitry is configured to determine the interest point threshold value based in part upon a target number of interest points preselected for the image frame.

5. The image processing system of claim 1 wherein the target number of interest points calculated for the previous sub-region is based at least in part on a total number of interest points pre-selected for the image frame and a total number of interest points detected for all prior processed sub-regions of the image frame.

6. The image processing system of claim 1 wherein the recognition rate is a value calculated for a previous sub-region.

7. The image processing system of claim 1 wherein the recognition rate is a cumulative rate determined based on all prior processed sub-regions of the image frame.

8. The image processing system of claim 1 wherein the image processing circuitry is configured to determine the recognition rate.

9. The image processing system of claim 1 wherein the image processing circuitry is configured to limit an amount of interest point data.

10. The image processing system of claim 9 wherein the image processing circuitry is configured to selectively discard interest point data based upon a target number of interest points for an image sub-region.

11. A method, comprising:

identifying, using image processing circuitry, one or more interest points in a first sub-region of image data associated with an image frame based upon an interest point threshold value;

determining, using the image processing circuitry, the interest point threshold value based at least in part upon a number of interest points identified in a previous sub-region of image data for the image frame, wherein the interest point threshold value is based in part upon a recognition rate;

processing, using the image processing circuitry, image data associated with the image frame based on the identified interest points;

generating, using the image processing circuitry, descriptor data for at least one identified interest point; and evaluating, using the image processing circuitry, a quality of matching between features of two or more images based at least in part on the descriptor data, wherein the interest point threshold value is based in part upon a target number of interest points calculated for the previous sub-region.

12. The method of claim 11, comprising determining the recognition rate.

13. The method of claim 11, comprising limiting an amount of interest point data.

14. A non-transitory, computer-readable medium having contents which cause one or more image processing devices to perform a method, the method comprising:

identifying, one or more interest points in a first sub-region of image data associated with an image frame based upon an interest point threshold value;

determining the interest point threshold value based at least in part upon a number of interest points identified in a previous sub-region of image data for the image frame, wherein the interest point threshold value is based in part upon a recognition rate; and processing image data associated with the image frame based on the identified interest points, wherein the method comprises:

generating descriptor data for at least one identified interest point; and evaluating a quality of matching between features of two or more images based at least in part on the descriptor data, wherein the interest point threshold value is based in part upon a target number of interest points calculated for the previous sub-region.

15. The non-transitory, computer-readable medium of claim 14 wherein the method comprises determining the interest point threshold value based in part upon a target number of interest points pre-selected for the image frame.

16. The non-transitory, computer-readable medium of claim 14 wherein the recognition rate is a value calculated for a previous sub-region.

* * * * *